(12) United States Patent
Bronson

(10) Patent No.: US 6,665,741 B1
(45) Date of Patent: Dec. 16, 2003

(54) PORTABLE COMPUTER WITH REMOVABLE I/O DEVICE

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 492 days.

(21) Appl. No.: 09/688,706

(22) Filed: Oct. 17, 2000

(51) Int. Cl.[7] ................................. G06F 3/00
(52) U.S. Cl. ................. 710/8; 710/62; 710/73
(58) Field of Search ............... 710/1, 5, 8, 301–303

(56) References Cited

U.S. PATENT DOCUMENTS

| | | | |
|---|---|---|---|
| 5,138,304 A | 8/1992 | Bronson | 340/707 |
| 5,765,113 A | 6/1998 | Russo et al. | 455/557 |
| 5,826,042 A * | 10/1998 | Kirkendoll | 710/303 |
| 5,832,296 A * | 11/1998 | Wang et al. | 710/3 |
| 5,847,305 A * | 12/1998 | Yoshikawa et al. | 84/634 |
| 6,035,350 A | 3/2000 | Swamy et al. | 710/73 |
| 6,211,870 B1 * | 4/2001 | Foster | 345/744 |
| 6,414,728 B1 * | 7/2002 | Faris et al. | 349/10 |
| 6,538,687 B1 * | 3/2003 | Saito et al. | 348/65 |

* cited by examiner

Primary Examiner—Kim Huynh
Assistant Examiner—Eron Sorrell

(57) ABSTRACT

A portable computer includes a removable I/O device, where the removable I/O device is separate from a built-in cursor control device of the computer so that the computer stays functional without the removable I/O device. Consequently, if the presenter wants to return to the computer and use it directly, he does not have to place the removable I/O device back in the computer, which may disrupt the operating mode. Alternatively, the removable I/O device or both a receiver system and the removable I/O device may be designed to fit in one of PC card slots of the computer when not in use. This alternative enables the presenter to use an existing computer for presentations by simply plugging the receiver system and/or the removable I/O device in one of the computer's existing slots. The computer may further provide for automatic configuration of external video output or internal display modes once the removable I/O device is detached from the computer. This alternative provides additional functionality and convenience for the presenter.

4 Claims, 4 Drawing Sheets

PORTABLE COMPUTER WITH REMOVABLE I/O DEVICE

TECHNICAL FIELD

The technical field is portable computing devices with removable input/output (I/O) interfaces.

BACKGROUND

Portable computers are frequently used to give slide or multimedia presentations with the aid of presentation software programs. However, during the presentation, the presenter or an assistant normally must push keys or buttons on the computer to control the presentation. If the presenter is controlling the presentation, the presenter must move back and forth from a speaking position to the computer, such movement may distract the presenter and the audience. Furthermore, the computer must be easily accessed by the presenter and must be provided with enough lighting so that the presenter can find the correct keys to push. If the assistant is controlling the presentation, the presenter must coordinate slide changes in advance with the assistant or give a command or cue during the presentation, which, again, may cause a distraction.

To overcome these problems, peripheral devices have been developed to provide wireless remote control of the computer. However, these peripheral devices require that an infrared (IR) or radio frequency (RF) receiver module be connected through a cable to the computer. The peripheral devices also require software installation and configuration in the computer. In addition, for IR control, a direct line-of-site is required between the receiver module and the hand-held remote control because of the short effective range for IR communication. In order to control the presentation, the presenter must turn from a speaking position to point the remote control to the receiver, which may distract the audience.

A recent attempt to overcome the problems associated with controlling a multimedia presentation is described in U.S. Pat. No. 6,035,350, issued Mar. 7, 2000 to Swamy et al. (hereinafter "Swamy"). Swamy describes a track-pad or other input/output (I/O) device detachable from a computer and adapted with a remote communication functionality using RF or IR technologies, thereby improving the performance of multimedia presentations and other graphic displays. While offering advantages over the prior art, Swamy still leaves much to be desired. One shortcoming of Swamy is that the detachable I/O device functions as the computer's only I/O device. The presenter can only use the detachable I/O device to control a presentation. If the presenter wants to return to and use the portable computer directly, the presenter has to place the detachable I/O device back in the computer, which may cause a distraction for both the presenter and the audience and may disrupt the computer's operating mode. In addition, if the detachable I/O device is misplaced, the computer will be rendered inoperable. This could cause serious problems during a presentation.

Another shortcoming of Swamy is that the portable computer has to be specifically designed to provide the functionality described in Swamy. For many existing computers, it is desirable that the detachable I/O device can be used on these standard computers by simply being plugged in one of the computer's existing slots, so that the presenter does not have to make the difficult choice between buying a completely new computer solely for presentations, which could be very costly, and conducting the presentations in the old fashion inconvenient way.

Finally, Swamy does not provide for automatic configuration of external video output or internal display modes, which may provide additional functionality and convenience for the presenter.

SUMMARY

A portable computer with a multimedia display capability includes a processor, a display and a cursor control device that is fixably connected to the computer and operably connected to the processor. The computer further includes a receiver system, operably connected to the processor, that receives wireless communication of commands and transfers the received commands to the processor. In addition, the computer includes a removable input/output (I/O) device, removably connected to the computer, that is inoperable when connected to the computer and is operable when removed from the computer and functions as a remote control for wirelessly communicating commands to the processor through the receiver system. Because the removable I/O device is separate from the built-in cursor control device, the computer stays functional without the removable I/O device. Consequently, if the presenter wants to return to and use the computer directly, the presenter does not have to place the removable I/O device back in the computer, which may disrupt the computer's operating mode.

In an another embodiment, the portable computer includes one or more Personal Computer (PC) card slots and the removable I/O device or both the receiver system and the removable I/O device may be designed to fit in one of the one or more PC card slots when not in use. This embodiment enables the presenter to use an existing computer for presentations by simply plugging the receiver system and/or the removable I/O device in one of the computer's existing slots.

In yet another embodiment, the portable computer includes an electrical signal connecter for detecting a detachment of the removable I/O device from the portable computer. The electrical signal connecter, upon detecting the detachment of the removable I/O device, triggers the processor to provide for automatic configuration of external video outputs or internal display modes. This embodiment provides additional functionality and convenience for the presenter.

DESCRIPTION OF THE DRAWINGS

The detailed description will refer to the following drawings in which like numerals refer to like items, and in which.

DETAILED DESCRIPTION

A portable computer includes a removable I/O device. The removable I/O device is separate from a cursor control device that is fixably connected to the computer, so that the computer stays functional without the removable I/O device. There are several advantages to using a separate removable I/O device from the built-in cursor control device. First, both the built-in cursor control device and the removable I/O device may be optimized for ergonomics of use, with one used for creating or interacting with the screen and keyboard, the other held in a presenter's hand while the presenter controls a presentation. Accordingly, the mechanical placement of controls, what the controls do, and the shape of the I/O device housing may be optimized independently. For example, the control buttons on the removable I/O device may include a forward, a backward and a blank screen buttons, which may be different from the control buttons on the built-in cursor control device. Second, having dual controls is advantageous if the presenter wants to return to and use the computer directly, e.g. select another presentation, modify content interactively, navigate through data or an Internet connection. The presenter does not have to place the removable I/O device back in the computer, which may disrupt the operating mode. Third, in the event that the removable I/O device is misplaced, the computer is still operable and thereby the presenter may still carry on the presentation using the built-in cursor control device in the conventional way.

In another embodiment, the computer includes one or more PC card slots, and the removable I/O device may be designed to fit in one of the one or more PC card slots of the computer when the removable I/O device is not in use. PC cards are generic industrial standard cards that can be plugged in computers. PC cards may include Personal Computer Memory Card International Association (PCMCIA) cards and other plug-in cards. This embodiment enables the user to continue to use his existing computer by simply plugging the removable I/O device in one of the computer's existing slots.

Still another embodiment provides for automatic configuration of external video outputs or internal display modes once the removable I/O device is detached from the computer. This embodiment provides additional functionality, saves the presenter precious time before and during a presentation, and avoids showing unintended information to the audience.

Figure 1:
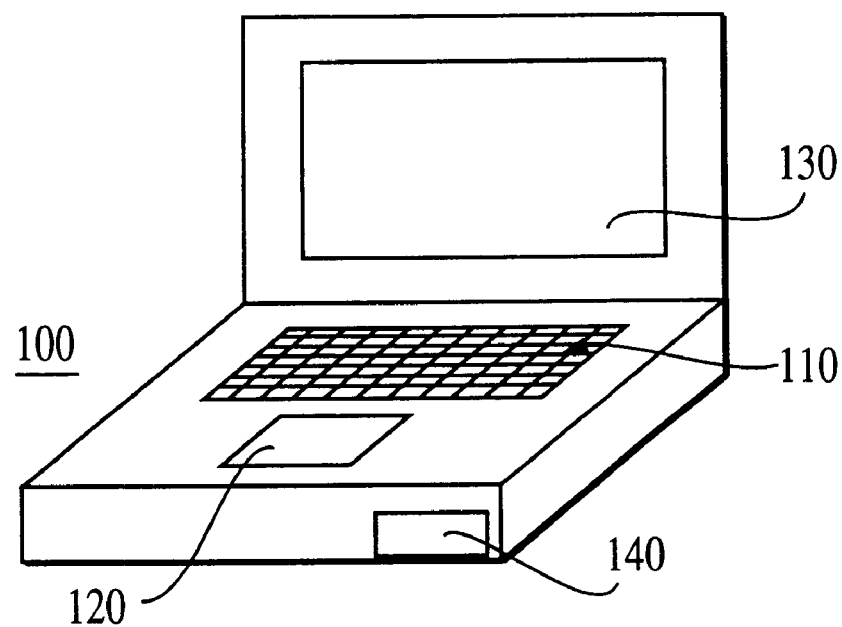
FIG. 1 is a front view of a portable computer with a removable I/O device.

FIG. 1 is a front view of a portable computer 100 with a removable I/O device 140. The portable computer 100, such as a notebook computer, laptop computer, handheld computer or the like, includes input and output features such as a keyboard 110, a display screen 130, and a cursor control device 120 that is fixably connected to the computer 100. The display 130 displays screens generated by a computer processor 220 (shown in FIG. 2) and a cursor (not shown) whose movement may be controlled by the cursor control device 120. The removable I/O device 140 is removably connected to the computer 100. The removable I/O device 140 is inoperable when connected to the computer 100 and is operable when removed from the computer 100 and functions as a remote control for wirelessly communicating commands to the processor 220 through a receiver system 240 (shown in FIG. 2).

Figure 2:
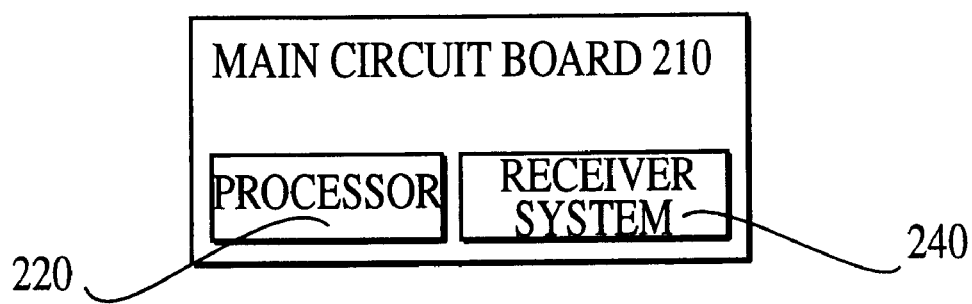
FIG. 2 is a block diagram of a computer system main circuit board with a processor and a receiver system connected.

FIG. 2 is a block diagram of a computer system main circuit board 210 with the processor 220 and the receiver system 240 connected. The receiver system 240 is connected to the main circuit board 210 as a peripheral device in the computer 100 for receiving wireless communication of commands from the removable I/O device 140 and transferring the received commands to the processor 220. Alternatively, the receiver system 240 may include a transmitter (not shown) for transmitting wireless communication of commands from the processor 220 to the removable I/O device 140.

The removable I/O device 140 when not in use may be inserted into a dedicated opening in the computer 100, as shown in FIG. 1, while the receiver system 240 is connected to the main circuit board 210, as shown in FIG. 2. Alternatively, the computer 100 may include one or more peripheral device slots, such as a disk-drive or a CD-ROM drive slot, and the removable I/O device 140 when not in use may be inserted into one of the one or more peripheral device slots in the computer 100, also shown in FIG. 1, while the receiver system 240, again, is connected to the main circuit board 210.

Figure 3:
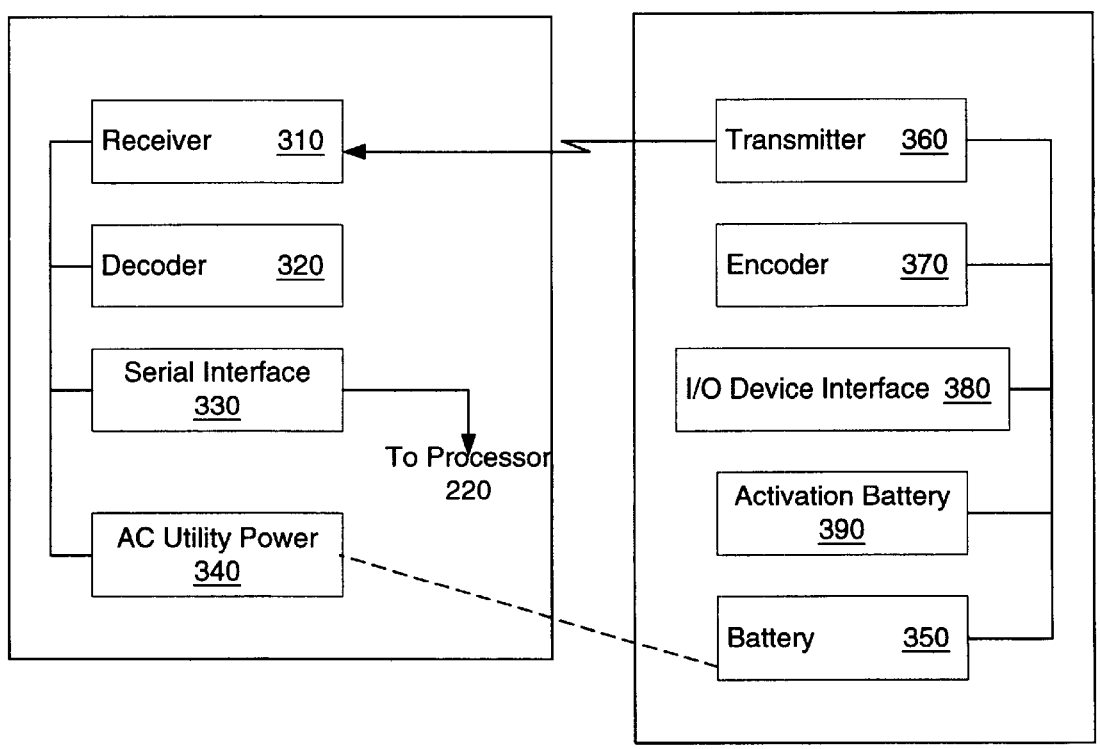
FIG. 3 is a schematic block diagram that illustrates the relationship between the receiver system and the removable I/O device of FIG. 1.

FIG. 3 is a schematic block diagram that illustrates the relationship between the receiver system 240 and the removable I/O device 140 of FIG. 1. The receiver system 240 may include a serial interface 330, a decoder 320, a receiver 310, and Utility power 340. The serial interface 330 may be a conventional serial interface, such as a universal asynchronous receiver and transmitter (UART), a universal synchronous and asynchronous receiver and transmitter (USART), an asynchronous communications interface adapter (ACIA), a serial input/output (SIO), a multiple protocol communications controller, a serial communications controller, a data link controller, and the like. The serial interface 330 may include an internal programmable baud rate generator (not shown) for transmitting a serial bit stream at a programmable baud rate up to 115.2 Kbaud or more.

As also shown in FIG. 3, the removable I/O device 140 may include activation buttons 390, an input/output (I/O) device interface 380, an encoder 370, a transmitter 360, and a battery 350, which may be rechargeable, e.g., a small rechargeable battery cell. The activation buttons 390 may be actuated by a user to generate control commands. The configuration of the activation buttons 390 may resemble the buttons and controls of standard I/O devices such as a mouse, a trackball, a track-pad or an ergonomically designed or hand held I/O device. The I/O device interface 380 converts control commands to a serial bit stream format for transmission and passes the serial bit stream signal to the encoder 370. The encoder 370 converts the serial bit stream signal into an electrical pulse form and passes the electrical pulse signal to the transmitter 360. The remote transmission signal may be an infrared (IR) signal or a radio frequency (RF) signal. For IR control, a direct line-of-site is generally required between the receiver system 240 and the removable I/O device 140. RF communication may have longer effective range and does not require a direct line-of-site, which may enable the presenter to walk around during a presentation in a large conference room or an auditorium. In the example of a RF signal, the transmitter 360 converts the electrical pulse signal into RF signals and transmits the RF signals at a selected baud rate. The battery 350 supplies operating power to the removable I/O device 140.

In the embodiment shown, the receiver system 240 receives the wireless communication of commands generated by the removable I/O device 140 and transforms the communication signals into received electrical pulses. In the example of a RF remote I/O device communication system, the receiver 310 detects RF signals generated by the removable I/O device 140 and converts the signals to electrical pulses. The receiver 310 passes the received electrical pulses to the decoder 320, which decodes the electrical pulses into a serial bit stream. The decoder 320 then directs the serial bit stream to a serial input location of the serial interface 330 for communication to the computer 100. The receiver system 240 may be powered by the Utility power 340, which may also supply operating power to the computer 100. The Utility power 340 may also recharge the rechargeable battery 350 when the removable I/O device 140 is connected to the computer 100. The receiver system 240 may be connected to a smart management (SM) bus (not shown) for supplying connections to multiple various I/O devices including the keyboard 110, and the cursor control devices 120. The SM bus detects the presence, number, type and location of installed I/O devices so that only installed devices are selectively powered.

As described above, the removable I/O device 140 is typically an input device that generates and transmits control commands to the receiver system 240 for controlling a presentation. Alternatively, the removable I/O device 140 may also be an output device that receives wireless communication of commands from the processor 220, again, through the receiver system 240, and displays corresponding messages. The receiver system 240 may include a transmitter (not shown) for wirelessly communicating commands from the processor 220 to the removable I/O deice 140. The removable I/O device 140 may include an I/O device display 650 (shown in FIG. 6(a) and 6(b)) that displays brief messages, for example, to remind the presenter of how much time is left. Alternatively, the I/O device display 650 may use different colored indicator light to show the time left, for example, a yellow light means three minutes left, while a red light means one minute left.

The removable I/O device 140 may be a modified version of standard track-pad or trackball I/O devices. Alternatively, the removable I/O device 140 may be constructed to have the appearance of a credit card size camcorder remote control or a small car alarm remote control both of which may be removably connected to a PC card. The removable I/O device 140 may also be a ring that can be worn on an index finger. The ring may include control buttons that are designed and located to be depressed by a thumb. Alternatively, the removable I/O device 140 may be a finger tip thimble that can be worn on a thumb. Similar to the ring, the finger tip thimble may include control buttons that are designed and located to be depressed by an index finger or other non-thumb fingers.

Figure 4:
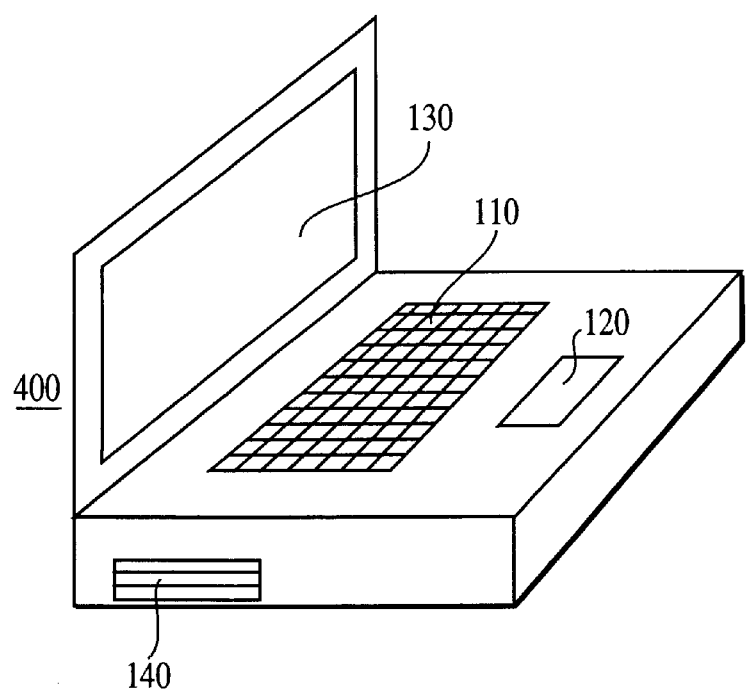
FIG. 4 is a side view of another portable computer with a removable I/O device.

FIG. 4 is a side view of another portable computer 400 with the removable I/O device 140. The computer 400 may include one or more PC card slots. The I/O device 140 when not in use may be inserted into one of the one or more PC card slots, while the receiver system 240 is connected to the main circuit board 210, as shown in FIG. 2.

Figure 5:
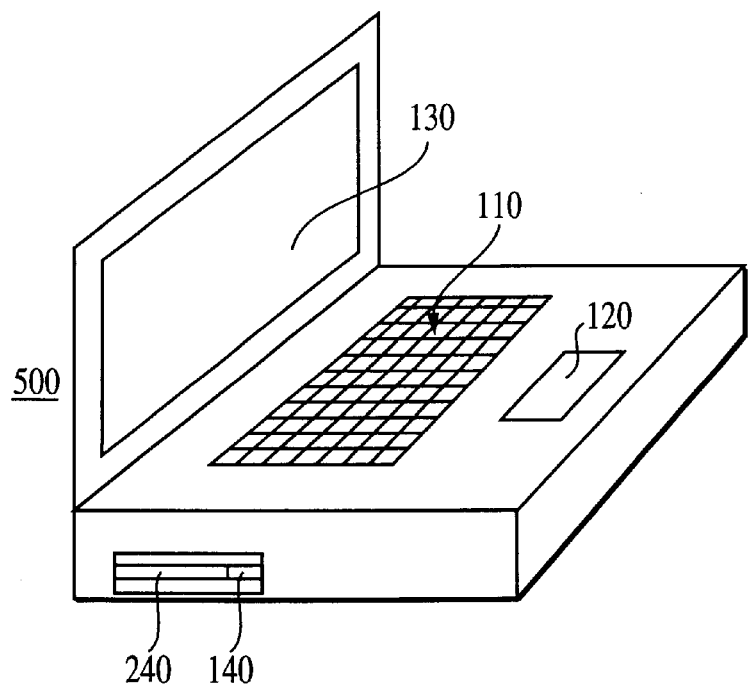
FIG. 5 is a side view of yet another portable computer with a removable I/O device.

FIG. 5 is a side view of yet another portable computer 500 with the removable I/O device 140. The computer 500 may include one or more PC card slots. The receiver system 240 may be a PC card that is inserted into one of the one or more PC card slots in the computer 500, and the removable I/O device 140 when not in use may be removably connected to the PC card. In this embodiment, the removable I/O device 140 may take the shape of a camcorder remote control or a small car alarm remote control. This embodiment enables the presenter to use an existing computer for presentations by simply plugging the receiver system 240 and the removable I/O device 140 in one of the existing PC card slots in the computer 500.

Figure 6A:
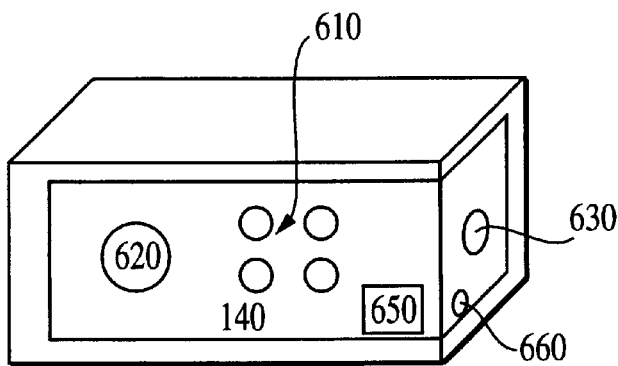
FIG. 6(a) shows in detail the removable I/O device of FIG. 4 inserted into the PC card slot.
Figure 6B:
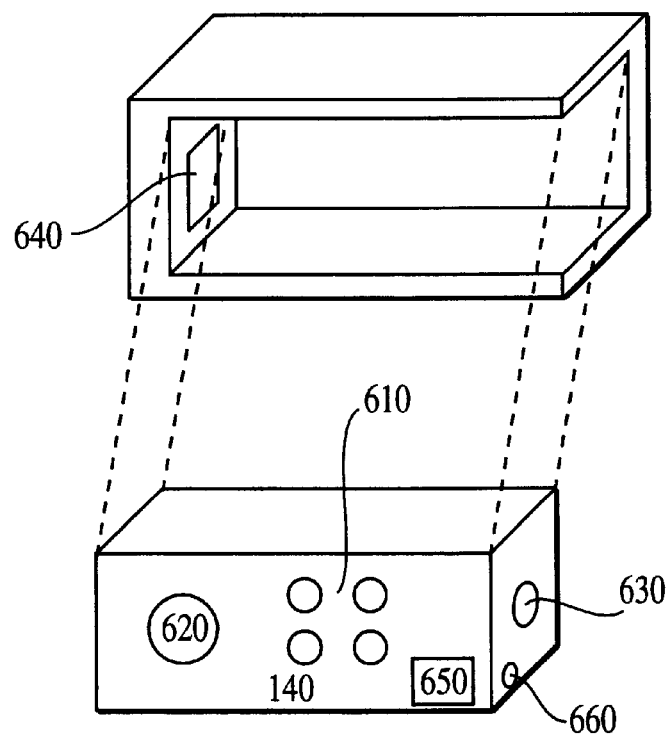
FIG. 6(b) shows in detail the removable I/O device of FIG. 4 detached from the PC card slot.

FIG. 6(a) shows in detail the removable I/O device 140 of FIG. 4 inserted into the PC card slot, while FIG. 6(b) shows the removable I/O device 140 detached from the PC card slot. As shown in both FIGS. 6(a) and 6(b), the activation buttons 390 of the removable I/O device 140 includes a cursor control 620 and a plurality of control buttons 610. The control buttons 610 may be one or more of a sequence button, a select button, a cursor control button, a laser pointer control button, and user programmable keys. The user programmable keys may enable the user to change pre-configured standard features. The cursor control 620 may resemble a normal cursor control of a mouse, a trackball or a track-pad. The removable I/O device 140 may further include an insertion/ejection aid 630 that uses a push-push latching and ejecting mechanism to securely store the removable I/O device 140. The insertion/ejection aid 630 may be similar to the X-Jack RJ11 connector used by 3Com for PC card modems. The removable I/O device 140 ejects and activates itself when the insertion/ejection aid 630 is pushed once, and latches and deactivates itself when the insertion/ejection aid 630 is pushed again.

Referring to FIG. 6(b), the computer 400 may include an electrical signal connector 640, inside one of the PC card slots, that firmly connects the removable I/O device 140 to the PC card slot during storage. The electrical signal connector 640 may also facilitate the recharging of the rechargeable battery 350 of the removable I/O device 140. In addition, the electrical signal connecter 640 may be a sensor that triggers the processor 220 to provide for automatic configuration of external video outputs or internal display modes upon detecting a detachment of the removable I/O device 140 from the computer 400. Alternatively, the electrical signal connector 640 may include a physical or optical switch to trigger the automatic configuration. For example, when the electrical signal connecter 640 detects that the removable I/O device 140 is detached from the computer 400, the electrical signal connecter 640 may trigger the processor 220 to activate the receiver system 240, to turn on an external presentation device, typically a video projector or other large screen display, to open and run a presentation program, and to send the program signals to the external presentation device. Similarly, when the electrical signal connecter 640 detects a connection between the removable I/O device 140 and the computer 400, the electrical signal connecter 640 may send a signal causing the recharging of the rechargeable battery 350 of the removable I/O device 140, and trigger the processor 220 to deactivate the receiver system 240 to save power, to turn off the external presentation device, and to alert the presentation program for appropriate actions such as shutting down the presentation program. The automatic configuration provides convenience to the presenter by saving him precious time before and during a presentation.

The automatic configuration may also provide additional functionality. The external presentation device may include a presentation screen (not shown). When the electrical signal connecter 640 detects that the removable I/O device 140 is detached from the computer 400, the electrical signal connecter 640 may trigger the processor 220 to send different sets of signals to the computer display 130 and the presentation screen so that the display 130 and the presentation screen may be optimized independently for both the presenter and the audience. The two sets of signals may be pre-programmed by the presenter in advance. For example, just prior to a presentation, the presentation screen may be programed to show a blank test pattern, a clock, title, or other images of the presenter's choice, while the presenter is using the computer display 130 to set up the presentation. Once the presentation begins, the presentation screen may show the presentation images, while the computer display 130 shows presenter notes and/or previews of the next slides. The computer display 130 may also show a clock or timer indicating whether the presenter needs to adjust the pace of the presentation and specific messages such as pick up the pace, skip the next slide, or indicate an urgent call for him, for example. When moving from one presentation to another, again, the presentation screen may be programmed to show a title image, while the presenter manipulates and selects files and options using the computer display 130. Accordingly, the automatic configuration avoids showing unintended information to the audience.

The two sets of signals shown on the computer display 130 and the presentation screen may be pre-programmed by the presenter using one or more of the user programmable keys located on the removable I/O device 140. The user programmable keys may also be programed to control other devices in the presentation environment, for example, room lights, an electronic projector, or an external multimedia source such as a video cassette recorder (VCR) or a digital video disc (DVD) player.

The removable I/O device 140 may further comprise a laser pointer 660, which may be a multi-modes and/or multi-color laser pointer. The laser pointer 660 may function as a normal laser pointer and enables the user to point to the external presentation device during a presentation. The combination of the removable I/O device 140 and the laser pointer 660 is desirable because the presenter has one less thing to hold in his hands during a presentation. The laser pointer 660 may be controlled by depressing one of the control buttons 610. U.S. Pat. No. 5,138,304 entitled Projected Image Light Pen describes how a laser pointer can be used to interact with a computer and is incorporated herein by reference.

The terms and descriptions used here are set forth by way of illustration only and are not meant as limitations. Those skilled in the art will recognize that numerous variations are possible within the spirit and scope of the invention as defined in the following claims.

What is claimed is:

1. An apparatus for remotely controlling a computer having a processor, comprising:

a receiver system, operably connected to the processor in the computer, that receives wireless communication of commands and transfers the received commands to the processor;

a removable I/O device, removably connected to the computer, that is deactivated and inoperable when connected to the computer and is activated and operable when removed from the computer and functions as a remote control for wirelessly communicating commands to the processor through the receiver system;

an electrical signal connecter for detecting a detachment of the removable I/O device from the computer; and wherein the electrical signal connecter, upon detecting the detachment of the removable I/O device, triggers the processor to provide for automatic configuration of external video outputs or internal display modes.

2. The apparatus of claim 1, wherein the electrical signal connecter, upon detecting the detachment of the removable I/O device, triggers the processor to activate the receiver system, to turn on an external presentation device, to open and run a presentation program, and to send program signals to the external presentation device.

3. The apparatus of claim 1, wherein the electrical signal connecter, upon detecting a connection between the removable I/O device and the computer, sends a signal causing the recharging of the rechargeable battery of the removable I/O device, and triggers the processor to deactivate the receiver system, to turn off the external presentation device, and to alert the presentation program for appropriate actions such as shutting down the presentation program.

4. The apparatus of claim 1, wherein the computer comprises a display and the external presentation device comprises a screen, and the electrical signal connector signal connector, upon detecting the detachment of the removable I/O device, triggers the processor to send different sets of signals to the display and the screen, wherein the different sets of signals may be pre-programmed in advance to be optimized or both a presenter and an audience.

* * * * *